(12) United States Patent
Wang et al.

(10) Patent No.: US 11,733,954 B2
(45) Date of Patent: Aug. 22, 2023

(54) RECEIVING CARD AND DISPLAY CONTROL CARD COMPONENT

(71) Applicant: XI'AN NOVASTAR TECH CO., LTD., Shaanxi (CN)

(72) Inventors: Xue Wang, Shaanxi (CN); Wei Liang, Shaanxi (CN); Guifeng Wei, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 17/057,706

(22) PCT Filed: Jul. 31, 2019

(86) PCT No.: PCT/CN2019/098574
§ 371 (c)(1),
(2) Date: Nov. 23, 2020

(87) PCT Pub. No.: WO2021/016918
PCT Pub. Date: Feb. 4, 2021

(65) Prior Publication Data
US 2022/0350562 A1    Nov. 3, 2022

(51) Int. Cl.
*H04L 12/861* (2013.01)
*G06F 3/14* (2006.01)

(52) U.S. Cl.
CPC .................................. *G06F 3/1446* (2013.01)

(58) Field of Classification Search
None
See application file for complete search history.

(56) References Cited

U.S. PATENT DOCUMENTS

| 8,019,883 B1 | 9/2011 | Margulis |
| 2009/0147028 A1 | 6/2009 | Sefton et al. |
| 2012/0033707 A1 | 2/2012 | Sloan |

(Continued)

FOREIGN PATENT DOCUMENTS

| CN | 107038990 A | 8/2017 |
| CN | 109147649 A | 1/2019 |
| WO | 2012033707 A1 | 3/2012 |

OTHER PUBLICATIONS

The EESR of family EP patent application dated Jun. 22, 2021.
Anonymous:"Media-independent interface—Wikipedia", Nov. 11, 2018(Nov. 11, 2018), pp. 1-10, XP055816778.

*Primary Examiner* — Carl Adams
(74) *Attorney, Agent, or Firm* — Gang Yu (57) ABSTRACT

Embodiments of the disclosure relate to a receiving card, which includes: a circuit board and a programmable logic device, a memory device, a plug-in component, a physical layer transceiver group and a plurality of Ethernet interfaces arranged on the circuit board. The memory device and the plug-in component are electrically connected with the programmable logic device; the plurality of Ethernet interfaces are respectively and electrically connected with a plurality of SerDes channels configured by the programmable logic device through the physical layer transceiver group; each of the plurality of SerDes channels includes two pairs of differential signal lines, and one of the two pairs of differential signal lines is used for transmitting data and the other pair of differential signal lines is used for receiving data.

10 Claims, 5 Drawing Sheets

(56) References Cited

U.S. PATENT DOCUMENTS

| | | | |
|---|---|---|---|
| 2012/0062800 A1* | 3/2012 | Sisto | H04N 9/67 |
| | | | 348/E9.047 |
| 2012/0079140 A1 | 3/2012 | Bar-Niv et al. | |
| 2012/0113265 A1* | 5/2012 | Galvin | H04N 21/2187 |
| | | | 348/E7.085 |
| 2013/0242497 A1 | 9/2013 | Lin et al. | |
| 2016/0125835 A1* | 5/2016 | Kim | G09G 5/006 |
| | | | 345/211 |
| 2017/0084223 A1 | 3/2017 | Li et al. | |
| 2020/0287846 A1* | 9/2020 | Elias | H04L 49/9063 |
| 2021/0044460 A1* | 2/2021 | Langner | H04L 12/40013 |
| 2022/0350562 A1* | 11/2022 | Wang | G09G 5/006 |

\* cited by examiner

RECEIVING CARD AND DISPLAY CONTROL CARD COMPONENT

TECHNICAL FIELD

The disclosure relates to the technical field of display, in particular to a receiving card and a display control card component.

BACKGROUND

A LED display screen has a significant advantage of being flexibly spliced into a large display screen, in addition to the advantages of high brightness and wide color gamut. The LED display screen is formed by splicing a display box provided with a receiving card, wherein the receiving cards arranged on the display box are connected through a network cable and used for transmitting image data signals. The LED display industry has been developing for many years, but for the current market, the products generally have a transmission rate of 1 Gbps; with the development of LED displays into small pitch displays, the 1 Gbps of transmission rate is obviously insufficient.

SUMMARY

In a first aspect of the embodiments of the disclosure provide a receiving card, which includes: a circuit board and a programmable logic device, a memory device, a plug-in component, a physical layer transceiver group and a plurality of Ethernet interfaces arranged on the circuit board. The memory device and the plug-in component are electrically connected with the programmable logic device; the plurality of Ethernet interfaces are respectively and electrically connected with a plurality of SerDes channels configured by the programmable logic device through the physical layer transceiver group; each of the SerDes channels includes two pairs of differential signal lines, and one of the two pairs of differential signal lines is used for transmitting data and the other pair of differential signal lines is used for receiving data.

In some embodiments of the disclosure, the physical layer transceiver group includes two 5 Gbase-T or 10 GBASE-T type Ethernet physical layer transceivers, the number of the plurality of Ethernet interfaces is two, and the two Ethernet interfaces are respectively and electrically connected with the two SerDes channels configured by the programmable logic device through the two 5 Gbase-T or 10 GBASE-T type Ethernet physical layer transceivers.

In some embodiments of the disclosure, the plug-in component includes a display data single-ended signal pin group, a display control signal single-ended signal pin group, and a display data differential signal pin group; the programmable logic device is electrically connected with the display data single-ended signal pin group and the display data differential signal pin group and used for outputting display data in a two-to-one mode of single-ended signals and LVDS differential signals; and the programmable logic device is electrically connected with the display control signal single-ended signal pin group and used for outputting a display control signal with a single-ended signal.

In some embodiments of the disclosure, the receiving card further includes: a direct current power circuit and a plurality of interfaces of the first type arranged on the circuit board, and the interface of the first types being different from the Ethernet interfaces; wherein the plurality of interfaces of the first type are respectively electrically connected with another plurality of SerDes channels configured by the programmable logic device, and the plurality of interfaces of the first type are also electrically connected with the direct current power circuit for acquiring power supply signals to be transmitted outwards.

In some embodiments of the disclosure, the plurality of interfaces of the first type are two USB 3.0 interfaces, and each of the USB 3.0 interfaces is electrically connected with one SerDes channel of the programmable logic device configuration.

In a second aspect of the embodiments of the disclosure provides another receiving card which includes: a circuit board and a programmable logic device, a memory device, a plug-in component, a direct current power circuit and a plurality of Ethernet interfaces arranged on the circuit board; wherein, the memory device and the plug-in component are electrically connected with the programmable logic device;
the plurality of interfaces of the first type are respectively and electrically connected with a plurality of SerDes channels configured by the programmable logic device, and are also electrically connected with the direct current power circuit for acquiring power supply signals to be transmitted outwards;
each of the SerDes channels includes two pairs of differential signal lines, and one of the two pairs of differential signal lines is used for transmitting data and the other pair of differential signal lines is used for receiving data.

In some embodiments of the disclosure, the plurality of interfaces of the first type are two USB 3.0 interfaces, and each of the USB 3.0 interfaces is electrically connected with one of the SerDes channels of the programmable logic device configuration.

In some embodiments of the disclosure, the plurality of interfaces of the first type are four USB 3.0 interfaces, and each of the USB 3.0 interfaces is electrically connected with one of the SerDes channels of the programmable logic device configuration.

In some embodiments of the disclosure, the plug-in component includes a display data single-ended signal pin group, a display control signal single-ended signal pin group, and a display data differential signal pin group; the programmable logic device is electrically connected with the display data single-ended signal pin group and the display data differential signal pin group and used for outputting display data in a two-to-one mode of single-ended signals and LVDS differential signals; and the programmable logic device is electrically connected with the display control signal single-ended signal pin group and used for outputting a display control signal with a single-ended signal.

In a third aspect of the embodiments of the disclosure provides a display control card component, including: aforementioned receiving card and at least one sub-card. wherein each sub-card is connected with one of the plurality of interfaces of the first type of the receiving card through a cable for transmitting data signals and power signals.

In some embodiments of the disclosure, the at least one sub-card includes a wireless transmission sub-card which includes: a second circuit board and a direct current/direct current circuit, a wireless transmitting chip and a wireless receiving chip; wherein the direct current/direct current circuit, the wireless transmitting chip and the wireless receiving chip are arranged on the second circuit board; the second circuit board is provided with a pad group, and the pad group is electrically connected with one end of the cable; the direct current/direct current circuit is electrically connected with the pad group, the wireless transmitting chip and the wireless receiving chip and used for acquiring a power signal from the pad group and providing working voltage to the wireless transmitting chip and the wireless receiving chip; the wireless transmitting chip and the wireless receiving chip are arranged at intervals and are electrically connected with the pad group through second SerDes channels which include two pairs of second differential signal lines, one of the two pairs of second differential signal lines is used for sending data, and the other is used for receiving data; and the working frequencies of the wireless transmitting chip and the wireless receiving chip are located in a millimeter wave frequency band.

In some embodiments of the disclosure, the at least one sub-card includes a wired network transmission sub-card, and the wired network transmission sub-card includes: a third circuit board and an interface of a second type, a direct current/direct current circuit, a physical layer transceiver and Ethernet interfaces arranged on the third circuit board; the interface of the second type and the interface of the first type are the same type of interfaces and are connected with one end of the cable; the direct current/direct current circuit is electrically connected with the interface of the second type and the physical layer transceiver and used for acquiring a power signal from the interface of the second type and providing working voltage for the physical layer transceiver; the physical layer transceiver is electrically connected with the interface of the second type through third SerDes channels, and the Ethernet interfaces are electrically connected with the physical layer transceiver; the third SerDes channels include two pairs of third differential signal lines, and one of the two pairs of third differential signal lines is used for transmitting data and the other is used for receiving data.

BRIEF DESCRIPTION OF THE DRAWINGS

In order to illustrate the technical solutions of the embodiments of the present disclosure more clearly, the drawings used in the description of the embodiments are briefly described below, and it is obvious that the drawings in the description below are only some embodiments of the present disclosure, and that other drawings can be obtained from these drawings without involving any inventive effort for a person skilled in the art.

DETAILED DESCRIPTION OF THE EMBODIMENTS

Reference will now be made in detail to the embodiments of the present disclosure, examples of which are illustrated in the accompanying drawings. Based on the embodiments in the present disclosure, all other embodiments obtained by a person skilled in the art without involving any inventive effort are within the scope of protection of the present disclosure.

Figure 1:
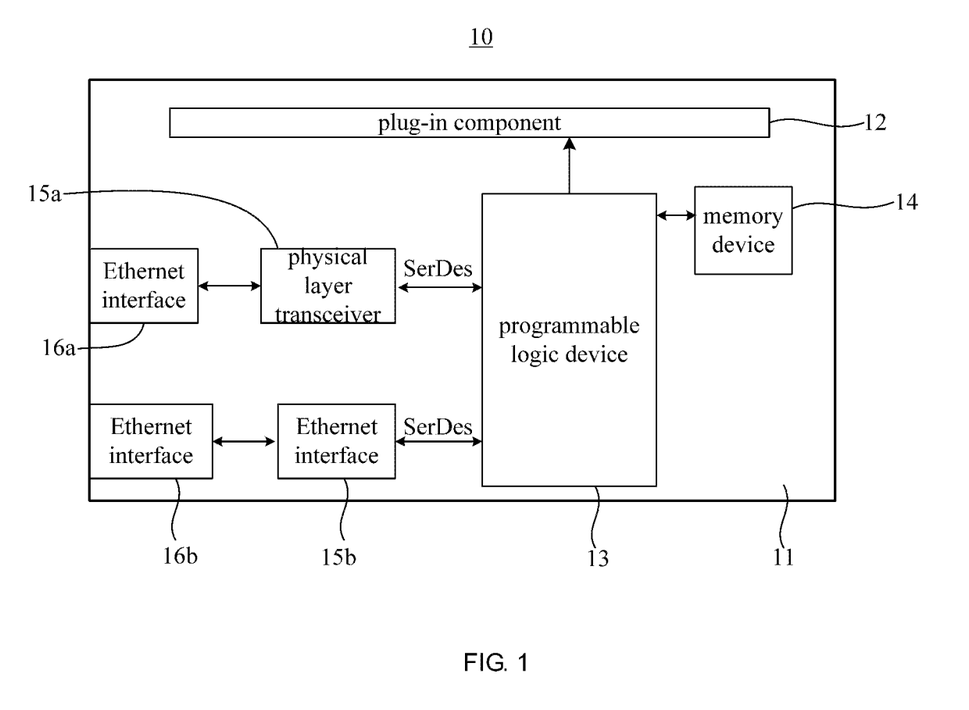
FIG. 1 is a schematic diagram of a receiving card according to an embodiment of the present disclosure.
Figure 2:
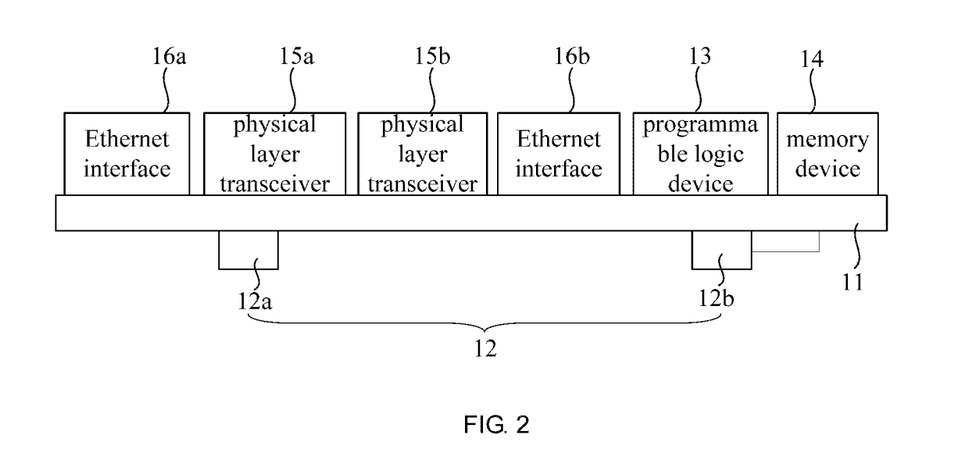
FIG. 2 is another perspective view of the receiving card of FIG. 1.
Figure 3:
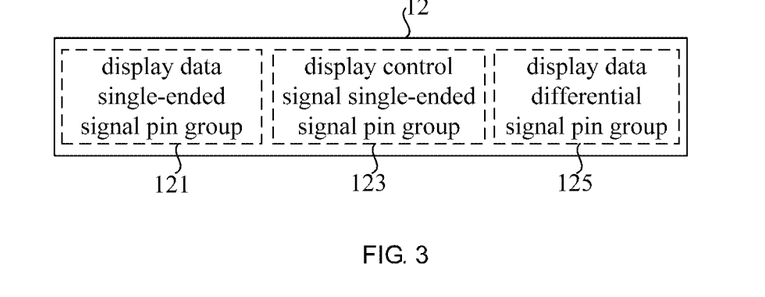
FIG. 3 is a functional schematic diagram of the pins of the plug-in component of the receiving card of FIG. 1.

Referring to FIGS. 1, 2 and 3, an embodiment of the present disclosure provides a receiving card 10 including: a circuit board 11 and a plug-in component 12, a programmable logic device 13, a memory device 14, physical layer transceiver groups 15a and 15b, and a plurality of, for example, two Ethernet interfaces 16a and 16b arranged on the circuit board 11.

The plug-in component 12 is electrically connected with a programmable logic device 13, which for example consists of two plug-in components 12a, 12b having the same number of pins, where the plug-in components 12a, 12b are for example 120 Pin high-density plug-in components, respectively, but the embodiments of the present disclosure are not so limited. Furthermore, as can be seen from FIG. 2, the plug-in component 12 is located on one side of the circuit board 11 (e.g., the bottom side of the circuit board 11), and the programmable logic device 13, the memory device 14, the physical layer transceiver groups 15a and 15b, and the Ethernet interfaces 16a and 16b are located on the other side of the circuit board 11 (e.g., the top side of the circuit board 11); this arrangement facilitates the plug-in attachment of the receiving card 11 to a patch panel (not shown). In addition, as can be seen from FIG. 3, the plug-in component 12 includes a display data single-ended signal pin group 121, a display control signal single-ended signal pin group 123, and a display data differential signal pin group 125, and the programmable logic device 13 is electrically connected with the display data single-ended signal pin group 121 and the display data differential signal pin group 125 for outputting display data such as RGB data in a two-to-one mode with single-ended signals and Low Voltage Differential Signaling (LVDS) differential signals; and the programmable logic device 13 is electrically connected with the display control signal single-ended signal pin group for outputting a display control signal such as a row decoding signal, an enable signal, a latch signal, a clock signal and even a row blanking signal with the single-ended signal. Therefore, the receiving card 11 can not only use single-ended signal transmission of RGB data, but also directly transmit LVDS differential signals to supply the LED module with displayed data. Compared with the traditional single-ended signal, the LVDS differential signal has the advantages that: (1) the anti-interference capability is strong, interference noise is generally equivalent, the interference noise is simultaneously loaded on the two signal lines, and the difference value is 0, i.e. the noise has no influence on the logic meaning of the signal; and (2) electromagnetic interference (EMI) can be effectively inhibited, because the two wires are close to each other and the signal amplitudes are equal, the amplitude of the coupling electromagnetic field between the two wires and the ground wire is equal, meanwhile, the signal polarities of the two wires are opposite, the electromagnetic fields of the two wires cancel with each other, and therefore the electromagnetic interference to the outside is small.

The programmable logic device 13 is, for example, a field programmable gate array (FPGA) device.

The memory device 14 is electrically connected with a programmable logic device 13, such as DDR4, DDR3, DDR2, LPDDR2, SDRAM, etc., while the number of memory devices used can be determined according to actual requirements.

Ethernet interfaces 16a and 16b are electrically connected with the two SerDes channels configured by programmable logic device 13 through physical layer transceivers 15a and 15b, respectively. In this embodiment, each SerDes channel includes two pairs of differential signal lines, and one of the two pairs of differential signal lines is used for transmitting data and the other pair of differential signal lines is used for receiving data. Physical layer transceivers 15a and 15b are, for example, 10 Gbase-T or 5 Gbase-T type Ethernet physical layer transceivers that may employ commercially available chips such as AQR111 C, AQR114 C, BCM54892, BCM54992, BCM54991, etc. This embodiment incorporates SerDes channels so that the transmission rate of a single Ethernet interface 16a/16b can be 10 Gbps/5 Gbps/2.5 Gbps/1 Gbps. Further, the Ethernet interfaces 16a, 16b may each be an RJ45 of an integrated network transformer, an RJ45 of a separate design from the RJ45 of the network transformer, or an RJ45 of a 2*1 integrated network transformer.

Figure 4:
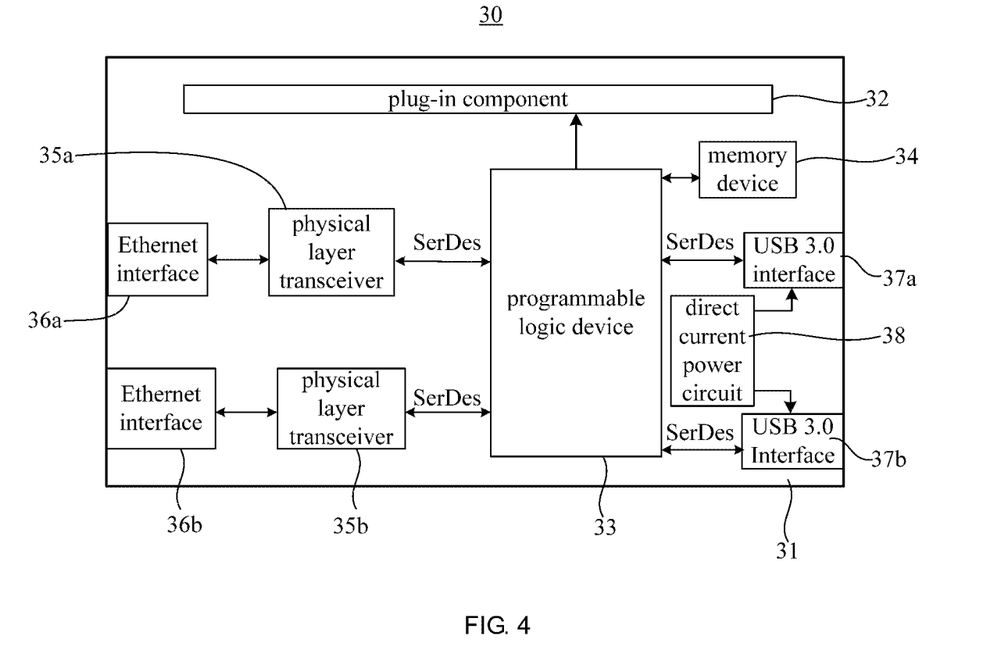
FIG. 4 is a schematic diagram of the structure of another receiving card provided by an embodiment of the present disclosure.

Considering that according to the embodiment shown in FIG. 1, signals are still transmitted by plugging and unplugging a network cable, since the network cable is relatively vulnerable to frequent plugging and unplugging, according to the embodiment shown in FIG. 4, a plurality of, for example two USB 3.0 interfaces are added to extend the signal transmission mode based on the embodiment shown in FIG. 1.

Specifically, as shown in FIG. 4, the receiving card 30 of the present embodiment includes: a circuit board 31 and a plug-in component 32, a programmable logic device 33, a memory device 34, physical layer transceiver groups 35a and 35b, a plurality of, for example, two Ethernet interfaces 36a and 36b, a plurality of, for example, two USB 3.0 interfaces 37a and 37b, and a direct current power circuit 38 arranged on the circuit board 31. The structures and functions of the plug-in component 32, the programmable logic device 33, the memory device 34, the physical layer transceiver groups 35a and 35b and the Ethernet interfaces 36a and 36b are similar to those of the plug-in component 12, the programmable logic device 13, the memory device 14, the physical layer transceiver groups 15a and 15b and the Ethernet interfaces 16a and 16b shown in FIG. 1. Therefore, the description will not be repeated here.

Further, the USB 3.0 interfaces 37a, 37b are electrically connected with a plurality of SerDes channels configured by the programmable logic device 33, respectively, and the USB 3.0 interfaces 37a, 37b are also electrically connected with a direct current power circuit 38 for acquiring power supply signals to be transmitted outwards. The USB 3.0 interfaces 37a, 37b herein are interfaces having multiple pairs of high speed differential signal pins and power supply signal pins, and thus may be replaced with other interfaces having multiple pairs of high speed differential signal pins and power supply signal pins, such as the Mini HDMI interface.

Figure 5:
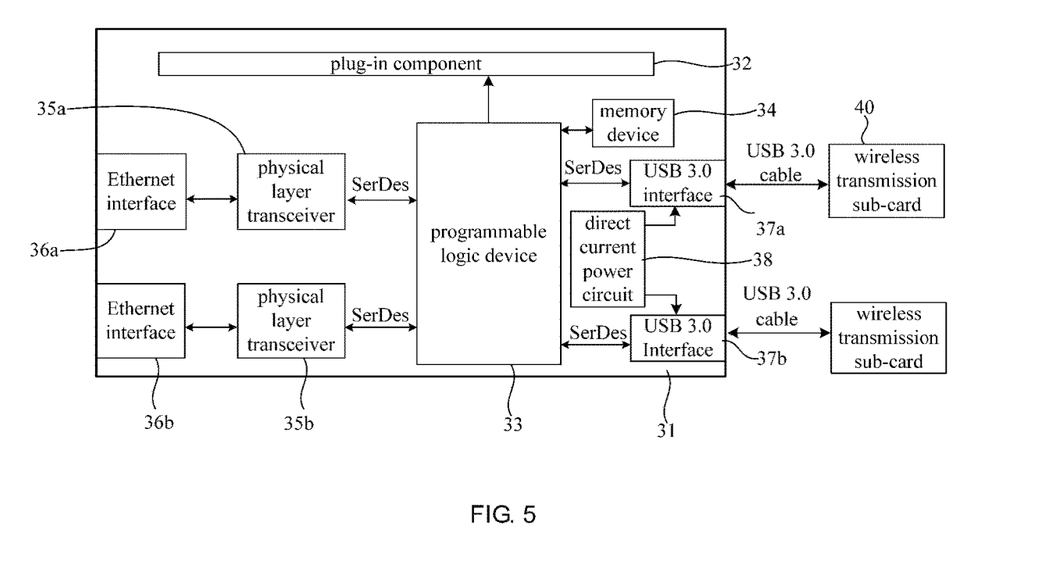
FIG. 5 is a schematic diagram showing the structure of a display control card component using the receiving card shown in FIG. 4.

As described above, the display control card component shown in FIG. 5 employing the wireless transmission sub-card 40 is derived for two USB 3.0 interfaces of the receiving card 30, such as a Micro USB 3.0 interface or other type of USB 3.0 interface. The main purpose of the wireless transmission solution shown in FIG. 5 is to solve the problems of frequent plugging and unplugging of industrial network cables, instability, high installation cost in the early stage and high maintenance cost in the later stage. Meanwhile, with the development of the LED display screen industry, the requirement of the small-space LED display screen is more and more, and the design of front maintenance is more and more popular; in view of the LED display screen front maintenance scheme, wireless transmission certainly provides a very high-quality scheme, which is convenient for LED display screen design and field installation and maintenance.

Figure 6:
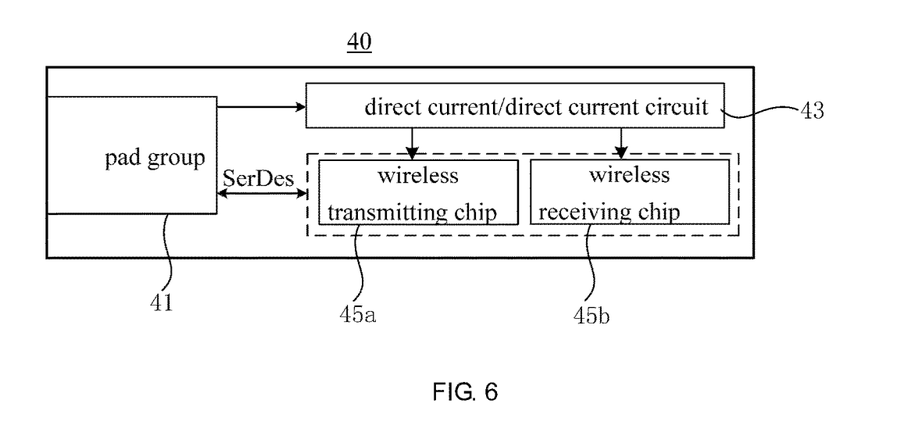
FIG. 6 is a schematic diagram showing the structure of the wireless transmission sub-card shown in FIG. 5.

Specifically, as shown in FIG. 5, each of the USB 3.0 interfaces 37a, 37b is connected with a wireless transmission sub-card 40 through a USB 3.0 cable. Here, the USB 3.0 cable is a cable capable of transmitting data signals and power signals simultaneously. Further, as shown in FIG. 6, the wireless transmission sub-card 40 includes: a circuit board and a direct current/direct current circuit 43, a wireless transmitting chip 45a and a wireless receiving chip 45b arranged on the circuit board. The circuit board is provided with a pad group 41 which is electrically connected with one end of the USB 3.0 cable. The direct current/direct current circuit 43 is electrically connected with the pad group 41, the wireless transmitting chip 45a and the wireless receiving chip 45b for acquiring a power signal from the pad group 41 and providing an operating voltage to the wireless transmitting chip 45a and the wireless receiving chip 45b. The wireless transmitting chip 45a and the wireless receiving chip 45b are arranged at intervals and are electrically connected with the pad group 41 through SerDes channels; the SerDes channels include two pairs of differential signal lines, and one of the two pairs of differential signal lines is used for transmitting data and the other pair of differential signal lines is used for receiving data. Further, the operating frequencies of the wireless transmitting chip 45a and the wireless receiving chip 45b are located in the millimeter wave band. The millimeter wave band herein typically refers to frequencies in the range of 30 GHz to 300 GHz, corresponding to wavelengths in the range of 1 mm to 10 mm. The wireless transmitting chip 45a and the wireless receiving chip 45b working in the millimeter wave frequency band of the embodiment are very suitable for disclosure of display boxes in the LED display screen, because the LED display screen is typically formed by splicing a plurality of display boxes, and after the wireless transmission sub-card 40 is arranged in each display box, the primary concern is how to avoid the wireless signal crosstalk between the two wireless transmission sub-cards 40 that do not need to transmit and receive data in the same LED display screen, and the wireless transmitting chip 45a and the wireless receiving chip 45b in the wireless transmission sub-card 40 in the embodiment work in a millimeter wave frequency band, so that the possibility of wireless signal crosstalk can be greatly reduced compared with wireless transmission modules such as a WiFi module, a Bluetooth module and the like in the related art. Furthermore, the present embodiment is preferably a wireless transmit chip 45a, and the operating frequency of the wireless receive chip 45b is in the frequency range 57 GHZ-67 GHZ or 71 GHZ-87 GHZ, for example 60 GHZ or 80 GHZ, based on the current performance of the wireless chip and the availability of frequency bands.

Figure 7:
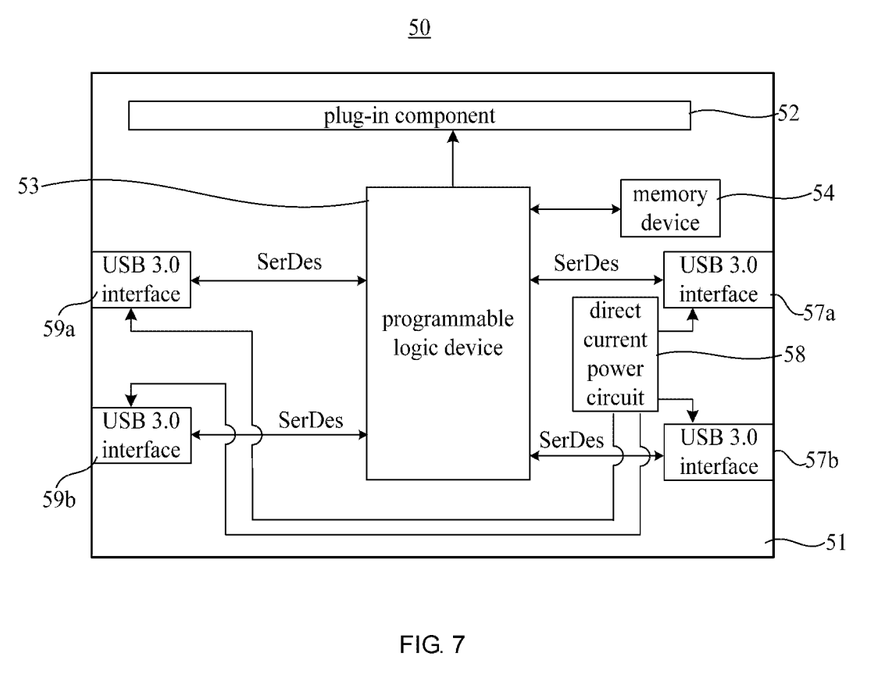
FIG. 7 is a schematic diagram of the structure of yet another receiving card provided by an embodiment of the present disclosure.

Referring to FIG. 7, according to the present embodiment, the receiving card 50 is removed the Ethernet interface+ physical layer transceiver of the receiving card 30 shown in FIG. 4, and connects all SerDes channels of the programmable logic device to an interface such as USB 3.0 (corresponding to an interface of the first type). The design not only can reduce the size of the receiving card, but also can enable the design scheme of the LED display screen control system adopting the receiving card to become diversified.

Specifically, as shown in FIG. 7, the receiving card 50 includes: a circuit board 51 and a plug-in component 52, a programmable logic device 53, a memory device 54, a plurality of, for example, four USB 3.0 interfaces 57a, 57b, 59a and 59b, and a direct current power circuit 58 arranged on the circuit board 51. The structures and functions of the plug-in component 52, the programmable logic device 53, and the memory device 54 are similar to those of the plug-in component 12, the programmable logic device 13, and the memory device 14 shown in FIG. 1, and will not be described in detail herein.

Further, the USB 3.0 interfaces 57a, 57b, 59a and 59b are electrically connected with a plurality of SerDes channels configured by the programmable logic device 53, respectively, and the USB 3.0 interfaces 57a, 57b, 59a and 59b are also electrically connected with a direct current power circuit 58 for acquiring power supply signals to be transmitted outwards. The USB 3.0 interfaces 57a, 57b, 59a and 59b herein are interfaces having multiple pairs of high-speed differential signal pins and power signal pins, and thus may be replaced with other interfaces having multiple pairs of high-speed differential signal pins and power signal pins, such as the Mini HDMI interface.

In addition, for the receiving card 50 provided with four USB 3.0 interfaces 57a, 57b, 59a and 59b in FIG. 7, the determination of transmission rate and signal transmission mode can be made directly on the sub-card, because for each USB 3.0 interface, there are a variety of connection schemes that can be used to connect to either a wireless transmission sub-card or a wired network transmission sub-card. Various connection schemes for the four USB 3.0 interfaces 57a, 57b, 59a and 59b of the receiving card 50 are listed below in connection with FIGS. 8-11.

Figure 8:
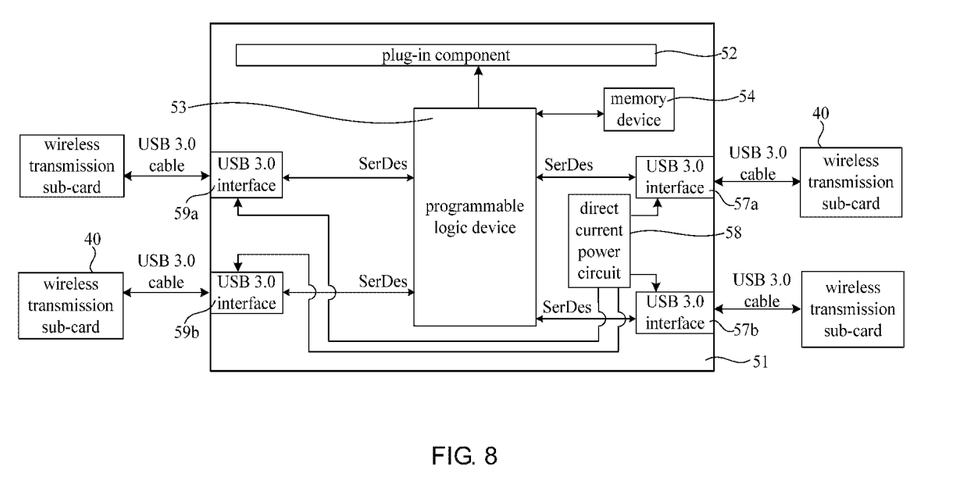
FIG. 8 is a schematic diagram showing the structure of a display control card component using the receiving card shown in FIG. 7.

Specifically, as shown in FIG. 8, four USB 3.0 interfaces 57a, 57b, 59a and 59b may be connected with the wireless transmission sub-card 40 through USB 3.0 cables, respectively, to realize wireless signal transmission.

Figure 9:
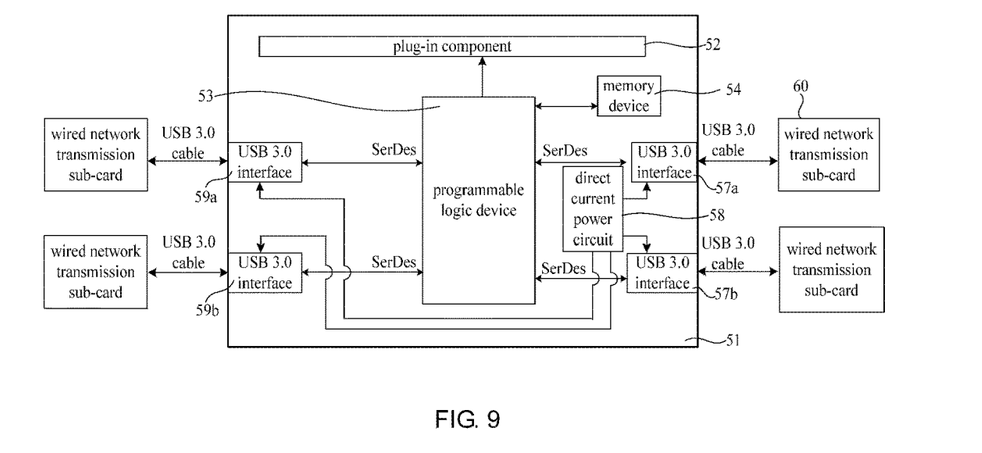
FIG. 9 is a schematic diagram showing the structure of another display control card component using the receiving card shown in FIG. 7.
Figure 10:
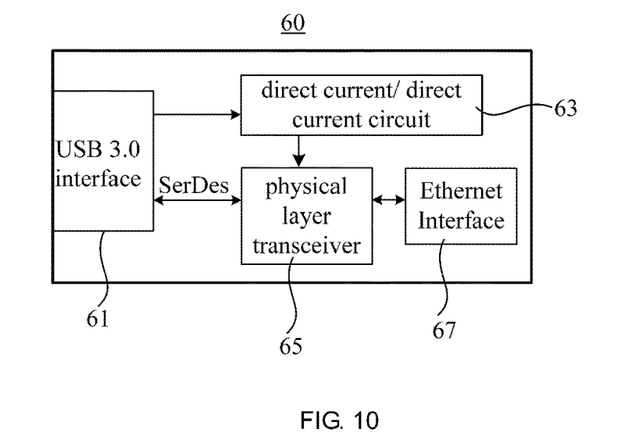
FIG. 10 is a structural diagram of the wired network transmission sub-card shown in FIG. 9.

Alternatively, as shown in FIG. 9, four USB 3.0 interfaces 57a, 57b, 59a and 59b may be connected with the wired network transmission sub-card 60 via USB 3.0 cables, respectively. As for the wired network transmission sub-card 60, as shown in FIG. 10, it includes: a circuit board and a USB 3.0 interface (corresponding to an interface of the second type) 61, a direct current/direct current circuit 63, a physical layer transceiver 65 and Ethernet interfaces 67 arranged on said circuit board. A USB 3.0 interface 61 connects one end of the USB 3.0 cable, which is an interface having multiple pairs of high speed differential signal pins and power signal pins. A direct current/direct current circuit 63 is electrically connected with the USB 3.0 interface 61 and the physical layer transceiver 65 for acquiring a power signal from the USB 3.0 interface 61 and providing an operating voltage to the physical layer transceiver 65. The physical layer transceiver 65 is electrically connected with the USB 3.0 interface 61 through SerDes channels, and here the SerDes channels include two pairs of differential signal lines, and one of the two pairs of differential signal lines is used for transmitting data and the other pair of differential signal lines is used for receiving data. Further, the physical layer transceiver 65 may be a 1 GBase-T12.5 GBase-T/5 GBase-T/10 GBase-T Ethernet physical layer transceiver or the like. In addition, the Ethernet interface 67 is electrically connected with the physical layer transceiver 65, which may say, for example, an RJ45 of an integrated network transformer, or a separate design of the network transformer and the RJ45.

Figure 11:
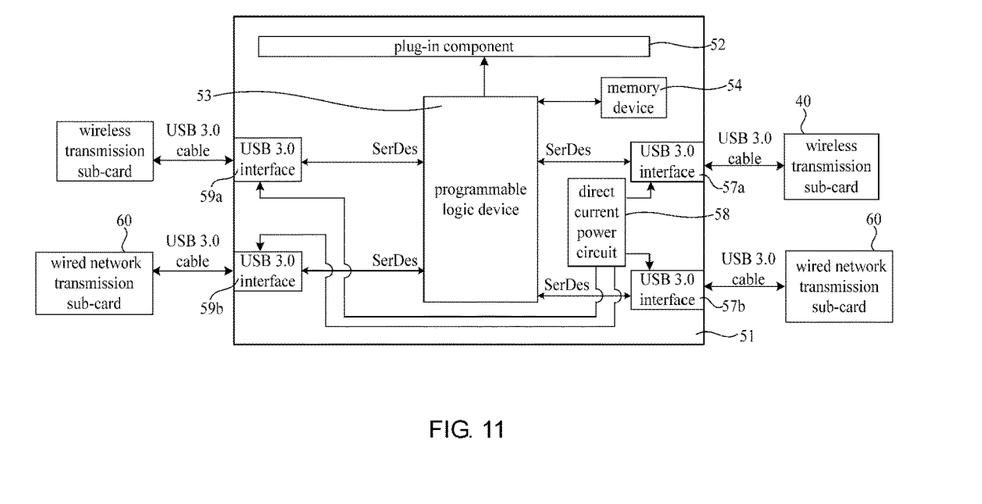
FIG. 11 is a schematic diagram showing the structure of another display control card component using the receiving card shown in FIG. 7.

Alternatively, as shown in FIG. 11, four USB 3.0 interfaces 57a, 57b, 59a and 59b may be connected with two wireless transmission sub-cards 40 and two wired network transmission sub-cards 60, respectively.

Only three structures of display control card components adopting the receiving card 50 are listed above, but the embodiment of the disclosure is not limited thereto; because of the flexibility of the receiving card 50, it can be used in a variety of scenarios, so the scheme design of the sub-card can be changed from scenario to scenario.

In summary, the receiving card and display control card component of embodiments of the present disclosure may have one or more of the following benefits: (i) for a transmission rate solution, the problem of insufficient gigabit bandwidth can be effectively solved, the method is more suitable for small pitch disclosure, the bandwidth can be 10 G/5 G12.5 G/1 G or even other bandwidths, the flexibility is higher, and the applicability is stronger; (ii) for a signal transmission mode solution, the problem that a traditional transmission mode network cable is frequently unplugged and plugged and easily damaged is solved, different signal transmission modes can be selected according to different disclosure scenes, diversification and practical effective disclosure of an LED display screen control system are greatly improved, and installation and maintenance workload is greatly shortened; and (iii) a conventional RGB single-ended signal is reserved, LVDS differential signals are added, transmission anti-interference capability can be enhanced, electromagnetic interference (EMI) can be effectively inhibited, and EMC is improved.

In addition, it is to be understood that the above-mentioned various embodiments are merely exemplary illustrations of the present disclosure, and that the technical solutions of the various embodiments can be combined and used in any combination on the premise that the technical features do not conflict, the structures do not conflict, and the purposes of the present disclosure are not violated.

Finally, it should be noted that: the above embodiments are merely illustrative of the technical solutions of the present disclosure and are not intended to be limiting thereof; although the present disclosure has been described in detail with reference to the foregoing embodiments, a person skilled in the art will appreciate that: the technical solutions of the above-mentioned embodiments can still be modified, or some of the technical features thereof can be equivalently replaced; these modifications and substitutions do not depart from the spirit and scope of the embodiments of this disclosure.

What is claimed is:

1. A receiving card, comprising: a circuit board and a programmable logic device, a memory device, a plug-in component, a physical layer transceiver group and a plurality of Ethernet interfaces arranged on the circuit board; wherein the memory device and the plug-in component are electrically connected with the programmable logic device;

the plurality of Ethernet interfaces are respectively and electrically connected with a plurality of SerDes channels configured by the programmable logic device through the physical layer transceiver group;

each of the plurality of SerDes channels comprises two pairs of differential signal lines, and one of the two pairs of differential signal lines is used for transmitting data and the other pair of differential signal lines is used for receiving data;

wherein the plug-in component comprises a display data single-ended signal pin group, a display control signal single-ended signal pin group, and a display data differential signal pin group; the programmable logic device is electrically connected with the display data single-ended signal pin group and the display data differential signal pin group to output display data in a two-to-one mode of single-ended signals and LVDS differential signals; and the programmable logic device is electrically connected with the display control signal single-ended signal pin group to output a display control signal with a single-ended signal.

2. The receiving card as claimed in claim 1, wherein the physical layer transceiver group comprises two 5 Gbase-T or 10 GBASE-T Ethernet physical layer transceivers, the number of the plurality of Ethernet interfaces is two, and the two Ethernet interfaces are respectively and electrically connected with the two SerDes channels configured by the programmable logic device through the two 5 Gbase-T or 10 GBASE-T Ethernet physical layer transceivers.

3. The receiver card as claimed in claim 1, further comprising: a direct current power circuit and a plurality of interfaces of a first type arranged on the circuit board, and the interface of the first types being different from the Ethernet interfaces;

wherein the plurality of interfaces of the first type are respectively electrically connected with another plurality of SerDes channels configured by the programmable logic device, and the plurality of interfaces of the first type are also electrically connected with the direct current power circuit for acquiring power supply signals to be transmitted outwards.

4. The receiving card as claimed in claim 3, wherein the plurality of interfaces of the first type are two USB 3.0 interfaces, and each of the USB 3.0 interfaces is electrically connected with one SerDes channel of the programmable logic device configuration.

5. A receiving card, comprising: a circuit board and a programmable logic device, a memory device, a plug-in component, a direct current power circuit and a plurality of interfaces of a first type arranged on the circuit board; wherein the memory device and the plug-in component are electrically connected with the programmable logic device;

the plurality of interfaces of the first type are respectively and electrically connected with a plurality of SerDes channels configured by the programmable logic device, and are also electrically connected with the direct current power circuit for acquiring power supply signals to be transmitted outwards;

each of the SerDes channels comprises two pairs of differential signal lines, and one of the two pairs of differential signal lines is used for transmitting data and the other pair of differential signal lines is used for receiving data;

wherein the plug-in component comprises a display data single-ended signal pin group, a display control signal single-ended signal pin group, and a display data differential signal pin group; the programmable logic device is electrically connected with the display data single-ended signal pin group and the display data differential signal pin group to output display data in a two-to-one mode of single-ended signals and LVDS differential signals; and the programmable logic device is electrically connected with the display control signal single-ended signal pin group and to output a display control signal with a single-ended signal.

6. The receiving card as claimed in claim 5, wherein the plurality of interfaces of the first type are two USB 3.0 interfaces, and each of the USB 3.0 interfaces is electrically connected with one of the SerDes channels of the programmable logic device configuration.

7. The receiving card as claimed in claim 5, wherein the plurality of interfaces of the first type are four USB 3.0 interfaces, and each of the USB 3.0 interfaces is electrically connected with one of the SerDes channels of the programmable logic device configuration.

8. A display control card component, comprising: the receiving card as claimed in claim 5, and at least one sub-card;

wherein each sub-card is connected with one of the plurality of interfaces of the first type of the receiving card through a cable for transmitting data signals and power signals.

9. The display control card component as claimed in claim 8, wherein the at least one sub-card comprises a wireless transmission sub-card, and the wireless transmission sub-card comprises: a second circuit board and a direct current/direct current circuit, a wireless transmitting chip and a wireless receiving chip; wherein the direct current/direct current circuit, the wireless transmitting chip and the wireless receiving chip are arranged on the second circuit board; the second circuit board is provided with a pad group, and the pad group is electrically connected with one end of the cable; the direct current/direct current circuit is electrically connected with the pad group, the wireless transmitting chip and the wireless receiving chip to acquire a power signal from the pad group and providing working voltage to the wireless transmitting chip and the wireless receiving chip; the wireless transmitting chip and the wireless receiving chip are arranged at intervals and are electrically connected with the pad group through second SerDes channels which comprise two pairs of second differential signal lines, one of the two pairs of second differential signal lines is used for sending data, and the other is used for receiving data; and the working frequencies of the wireless transmitting chip and the wireless receiving chip are located in a millimeter wave frequency band.

10. The display control card component as claimed in claim 8, wherein the at least one sub-card comprises a wired network transmission sub-card which comprises: a third circuit board and an interface of a second type, a direct current/direct current circuit, a physical layer transceiver and Ethernet interfaces arranged on the third circuit board; the interface of the second type and the interface of the first type are the same type of interfaces and are connected with one end of the cable; the direct current/direct current circuit is electrically connected with the interface of the second type and the physical layer transceiver and used for acquiring a power signal from the interface of the second type and providing working voltage for the physical layer transceiver; the physical layer transceiver is electrically connected with the interface of the second type through third SerDes channels, and the Ethernet interfaces are electrically connected with the physical layer transceiver; the third SerDes channels include two pairs of third differential signal lines, and one of the two pairs of third differential signal lines is used for transmitting data and the other is used for receiving data.

* * * * *